United States Patent
Bruna et al.

(10) Patent No.: US 7,974,483 B2
(45) Date of Patent: Jul. 5, 2011

(54) METHOD AND CORRESPONDING DEVICE FOR BLOCK CODING DATA

(75) Inventors: Arcangelo Ranieri Bruna, San Cataldo (IT); Luca Celetto, Udine (IT)

(73) Assignee: STMicroelectronics S.r.l., Agrate Brianza (MI) (IT)

( * ) Notice: Subject to any disclaimer, the term of this patent is extended or adjusted under 35 U.S.C. 154(b) by 1572 days.

(21) Appl. No.: 11/267,077

(22) Filed: Nov. 4, 2005

(65) Prior Publication Data

US 2006/0098732 A1    May 11, 2006

(30) Foreign Application Priority Data

Nov. 5, 2004    (IT) .............................. TO2004A0764

(51) Int. Cl.
*G06K 9/36* (2006.01)
*G06K 9/46* (2006.01)

(52) U.S. Cl. ................... 382/239; 382/250; 375/240.03; 375/240.2; 375/240.24

(58) Field of Classification Search .................. 382/239, 382/248, 250, 251; 375/240.02, 240.03, 375/240.2, 240.24

See application file for complete search history.

(56) References Cited

U.S. PATENT DOCUMENTS

| | | | |
|---|---|---|---|
| 5,543,843 A * | 8/1996 | Kato et al. | 348/400.1 |
| 5,604,502 A | 2/1997 | Haskell et al. | 341/200 |
| 6,275,527 B1 | 8/2001 | Bist et al. | 375/240 |
| 2001/0019588 A1 * | 9/2001 | Naito et al. | 375/240.24 |

OTHER PUBLICATIONS

August et al., "Low power design of DCT and IDCT for low bit rate video codes", IEEE vol. 6, No. 3, Jun. 2004 pp. 1-9.
"Text of ISO/IEC 14496-2 Visual Third Edition", ITU Study Group 16, Video Coding Experts Group, Aug. 2003, pp. 1-180 (part 1).
"Text of ISO/IEC 14496-2 Visual Third Edition", ITU Study Group 16, Video Coding Experts Group, Aug. 2003, pp. 1-270 (part 2).
"Text of ISO/IEC 14496-2 Visual Third Edition", ITU Study Group 16, Video Coding Experts Group, Aug. 2003, pp. 1-270 (part 3).
"Text of ISO/IEC 14496-2 Visual Third Edition", ITU Study Group 16, Video Coding Experts Group, Aug. 2003, pp. 1-24 (part 4).

* cited by examiner

*Primary Examiner* — Phuoc Tran
(74) *Attorney, Agent, or Firm* — Lisa K. Jorgenson; Allen, Dyer, Doppelt, Milbrath & Gilchrist, P.A.

(57) ABSTRACT

The method for block coding data, such as video data, via a compression operation includes applying to input-data blocks a discrete-cosine-transform (DCT) operation and a quantization operation to produce compressed-data blocks. The compressed-data blocks are subjected to a coding operation to obtain compressed output flows; and an inverse-quantization operation and an inverse-discrete-cosine-transform (IDCT) operation are applied on the compressed-data blocks to obtain reconstructed blocks. The method includes controlling generation of mismatch errors from the input-data blocks by detecting data blocks from the input-data blocks and compressed-data blocks that are liable to cause mismatch errors, and modifying the blocks that are liable to cause mismatch errors prior to the coding operation.

27 Claims, 3 Drawing Sheets

METHOD AND CORRESPONDING DEVICE FOR BLOCK CODING DATA

FIELD OF THE INVENTION

The present invention relates to methods and devices for block coding of data, in particular image and video data, via compression including a discrete cosine transform (DCT).

BACKGROUND OF THE INVENTION

The standards of compression based upon DCT include, by way of example, the standards MPEG-1, MPEG-2, MPEG-4 and H.263. The MPEG-4 standard contains an extended set of data-compression procedures. To achieve different goals, the procedures are divided into sets with progressively increasing capacities, referred to as "profiles". Within each profile, the admissible range of parameters is governed through "levels". Hence, an implementation of a certain given coding apparatus is specified through a given profile and a given level.

The MPEG-4 standard enables reduction of the redundancy in the image of a sequence, transforming the data in an appropriate way. Application of an orthonormal transform enables concentration of the energy of the signal in the low-frequency coefficients, the information associated to which will be appropriately reduced to adapt to the channel.

The correlation of the image is present between pixels that are locally adjacent in the image and between frames that are close to one another in time. For this reason, the MPEG-4 standard enables three different kinds of frames, designated by the letters I, P, and B. The frames I (Intra) are coded without any temporal reference. They require a large number of bits, but enable reconstruction of the quality of the image and have a random access to the sequence. The reconstructed images of type I (anchor frame) are used as references for reconstruction of the images that follow in the sequence.

The frames P (Inter) are coded using the temporal correlation with the preceding frames of type I or P. The coding device estimates the movement that has occurred between two frames and sends corresponding motion vectors to the decoding device. The residual information, given by the difference between the original image and the information shown obtained from the anchor frame, contains the data that cannot be estimated through motion vectors.

The frames of type B (two-directional frames) are coded using the temporal correlation with the preceding and following frames of type I or P. Since two possible references are available, the coding device can choose the direction that is less costly in terms of dimensions of the compressed data. Since both the preceding images and the following images are used, the transmission and the temporal order must be modified so as to have all the information necessary for reconstructing the two-directional predicted frames. The profile referred to as "simple" used by the MPEG-4 standard makes use of only frames of type I and P.

Potentially, coding of the predicted frames (whether P frames or B frames) can cause a mismatch between the coding device and the decoding device. To code a frame of such a type, the coding device must in fact store the preceding frame to be used for the temporal prediction. Consequently, both the coding device and the decoding device reconstruct the current frame, which is used as reference for the future images.

Theoretically, the coding device and the decoding device would require having available exactly the same set of reconstructed data to reconstruct correctly the decoded image and thus prevent occurrence of the so-called mismatch error between the two images reconstructed at the encoder end and at the decoder end. In practice, minimal differences between the two images are, however, acceptable.

These differences are due to the particular discrete-cosine-transform procedure used. In fact, the goal of standards, and in particular of the MPEG-4 standard, is to allow the developers and implementers of the circuits the highest possible degree of freedom in implementing of the procedure. Since many DCT algorithms have been developed in the past, different implementers can use their own approaches to get an edge over the competitors, using the most innovative algorithms. However, since each DCT algorithm intrinsically represents a method of approximation of the cosine transform, different approximations generate slightly different results. Standards of the MPEG-4 type define the maximum amount of differences allowed.

However, since, as explained previously, the images are predicted on the basis of the preceding ones, the difference tends to increase in time. The MPEG-4 standard defines statistically the maximum amount of variation between two images.

When the coding device and the decoding device operate on different preceding data, because they use different DCT algorithms, the so-called mismatch error thus occurs. As stated previously, the difference between the coding device and the decoding device may be due only to the modules that execute the discrete cosine transform (DCT) and the inverse discrete cosine transform (IDCT). In fact, it is the result on the individual block that can vary between different codings.

The MPEG-4 standard provides only limits of tolerated error, as may be seen from Annex A of the ISO/IEC 14496-2 recommendation, "Coding of audio—visual objects—Part 2: Visual", pp. 253-254, Third edition: 2003.

In particular, the mismatch occurs when the coding device and the decoding device obtain different outputs from the IDCT block. Two different cases may arise: the IDCT of the coding device supplies a zero block, i.e., a block identified by zero coefficients, from a block of the input data flow that originally was non-zero, while the decoding device supplies a non-zero block; or else the IDCT of the coding device supplies a non-zero block, while the decoding device supplies a zero block.

An example of a similar problem can be obtained from an examination of FIG. 1, which represents a working diagram of a coding and decoding method that involves a compression via DCT. In FIG. 1, the reference number 100 consequently designates a coding device, which comprises a block 120 representing a DCT operation and a block 130 representing a quantization operation with a certain quantization step QP. The blocks 120 and 130 receive at input a noncompressed-data flow I, divided into blocks B, and return compressed blocks DB at output, which, via coding operations not represented in detail in FIG. 1, involve, for example, the use of Huffman tables, and are then coded in an output compressed-data flow O. CB designates a current block, i.e., the block that is processed at a given instant by the coding device 100, and that, in the case shown, is assumed as containing non-zero coefficients.

Present in the coding device 100 is a branch that fetches the compressed-data flow O and executes a set of inverse operations, i.e., an inverse quantization operation in a block 190 and an IDCT operation in a block 195, to obtain reconstructed blocks RB to be used in the reconstruction of the frames.

The reference 100' thus designates a decoding device, which receives at input the compressed-data flow O and carries out thereon an inverse-quantization operation represented by a block 190' and an IDCT operation in a block 195', to supply reconstructed blocks RB' in a decompressed-data flow I'.

FIG. 1 shows the case where the block RB reconstructed by the coding device 100 and the block RB' reconstructed by the decoding device 100' are different on account of implementation of different procedures at the coding device 100 and at the decoding device 100'. In particular, the block RB reconstructed by the coding device 100 is a zero block, i.e., all its coefficients are zero.

The MPEG-4 standard strongly recommends avoidance of such a case, i.e., the case where the IDCT of the coding device supplies a zero block, while the output of the coding device itself supplies a non-zero block (section "Mismatch control" (7.4.4.5) of the ISO/IEC 14496-2 recommendation, "Coding of audio—visual objects—Part 2: Visual", pp. 253-254, Third edition: 2003). Normally, the effects are not visible, since the margins defined are sufficient to guarantee negligible differences between the frames reconstructed at the coding-device end. However, in particular situations, the results of the mismatch may be very evident.

For example, when a still image is coded, prediction data with small errors are sent to the decoding device. These data can be reconstructed as zero data by the IDCT in the coding device, whereas they are reconstructed as non-zero data by another type of IDCT implementation at the decoding device. When the same data are present at the coding device in the next image, the same mismatch occurs between the coding device and the decoding device. The errors accumulate in the same points, and the reconstructed images soon diverge.

Consequently, even though the standards fix quantitative limits of mismatch error, from the state of the art no approaches are known for attenuating or eliminating the mismatch error.

SUMMARY OF THE INVENTION

The object of the present invention is to resolve the drawback described above and to provide an approach that will enable intervention on the mismatch error.

According to the present invention, the object is achieved by a method for block coding data, such as video data, via a compression operation including applying to input-data blocks a discrete-cosine-transform (DCT) operation and a quantization operation to produce compressed-data blocks. The compressed-data blocks are subjected to a coding operation to obtain compressed output flows; and an inverse-quantization operation and an inverse-discrete-cosine-transform (IDCT) operation are applied on the compressed-data blocks to obtain reconstructed blocks. The method includes controlling generation of mismatch errors from the input-data blocks by detecting data blocks from the input-data blocks and compressed-data blocks that are liable to cause mismatch errors, and modifying the blocks that are liable to cause mismatch errors prior to the coding operation.

The present invention also includes a corresponding coding device, as well as a computer-program product that can be loaded into the memory of at least one computer and comprises portions of software code for implementing the aforesaid method. As used herein, reference to such a computer-program product is understood as being equivalent to reference to a computer-readable medium containing instructions for controlling a computer system to co-ordinate execution of the method according to the invention. Reference to "at least one computer" is intended to highlight the possibility for the present invention to be implemented in a distributed and/or modular way.

BRIEF DESCRIPTION OF THE DRAWINGS

The invention will now be described, by way of non-limiting example, with reference to the drawing figures, wherein.

DETAILED DESCRIPTION OF THE PREFERRED EMBODIMENTS

In summary, a block-coding method and a corresponding device for block coding of data are provided, which envisage detecting in the coding step whether a block currently being coded is liable to generate a mismatch error, and, if so, modifying the current block to eliminate the mismatch error.

To take into account the type of implementation of the coding device, i.e., whether the coding device will be implemented in a purely software way or in a mixed hardware/software way, two different embodiments are proposed, which envisage, respectively: resetting the block coefficients to zero, to enables a simple low-power implementation to be obtained, as will be illustrated more clearly hereinafter with reference to FIG. 2; and incrementing the value of the quantizer to prevent the mismatch, which is illustrated hereinafter with reference to FIG. 3, and appears to be the better approach in terms of quality and of PSNR (Peak Signal-to-Noise Ratio) values, even though it requires all the blocks of one and the same macroblock to be coded with a higher quantizer value.

The first embodiment, which contemplates, that is, zeroing the coefficients of the block before coding, substantially envisages verifying, after the IDCT at the encoder end, whether a zero block is reconstructed from a block that contains some non-zero DCT coefficients. If this occurs, the coding device is configured for forcing to zero a block in terms of Huffman coding.

Figure 1:
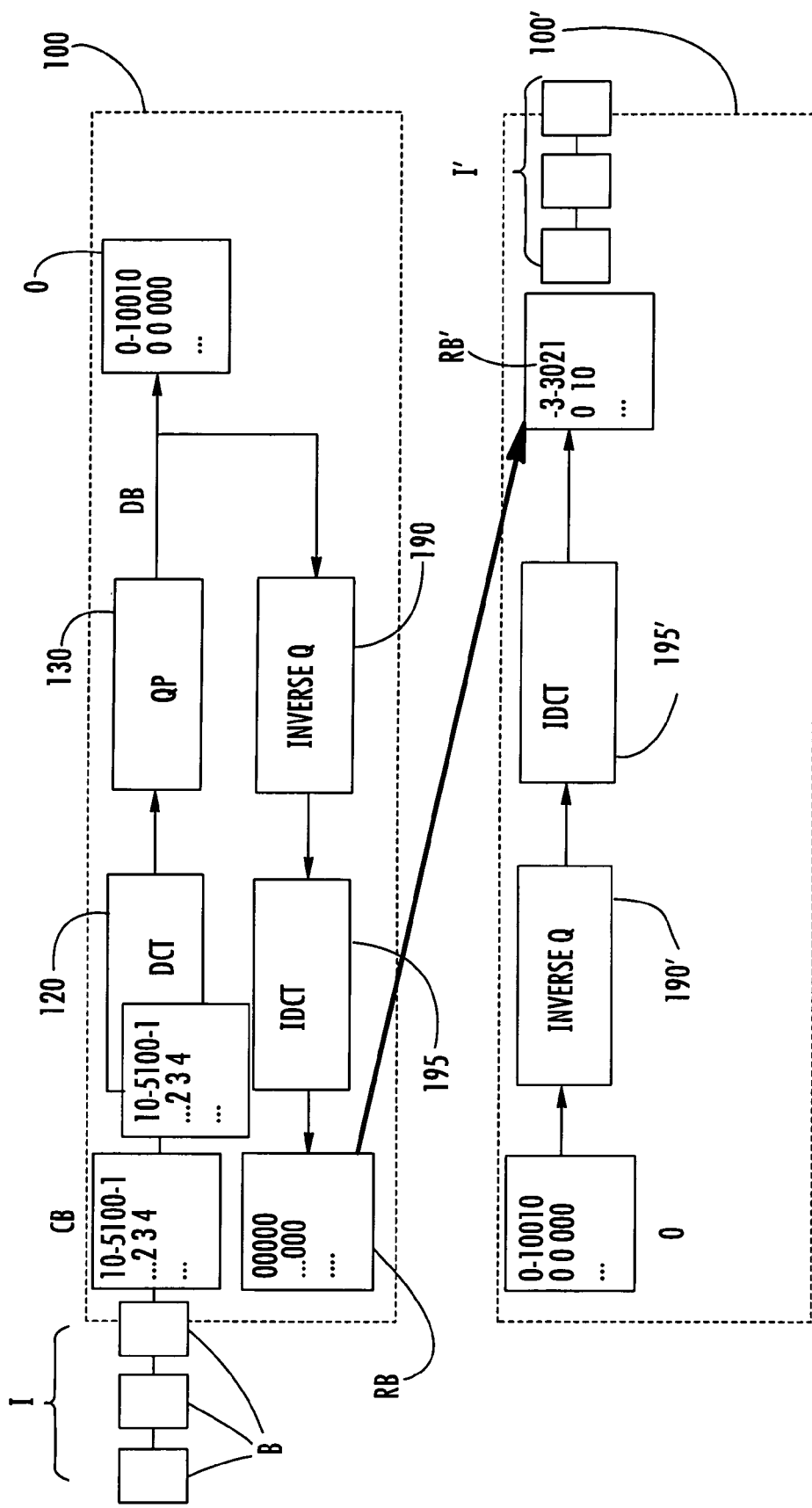
FIG. 1 is a block diagram illustrating a coding and decoding method that involves a compression via DCT in accordance with the prior art.
Figure 2:
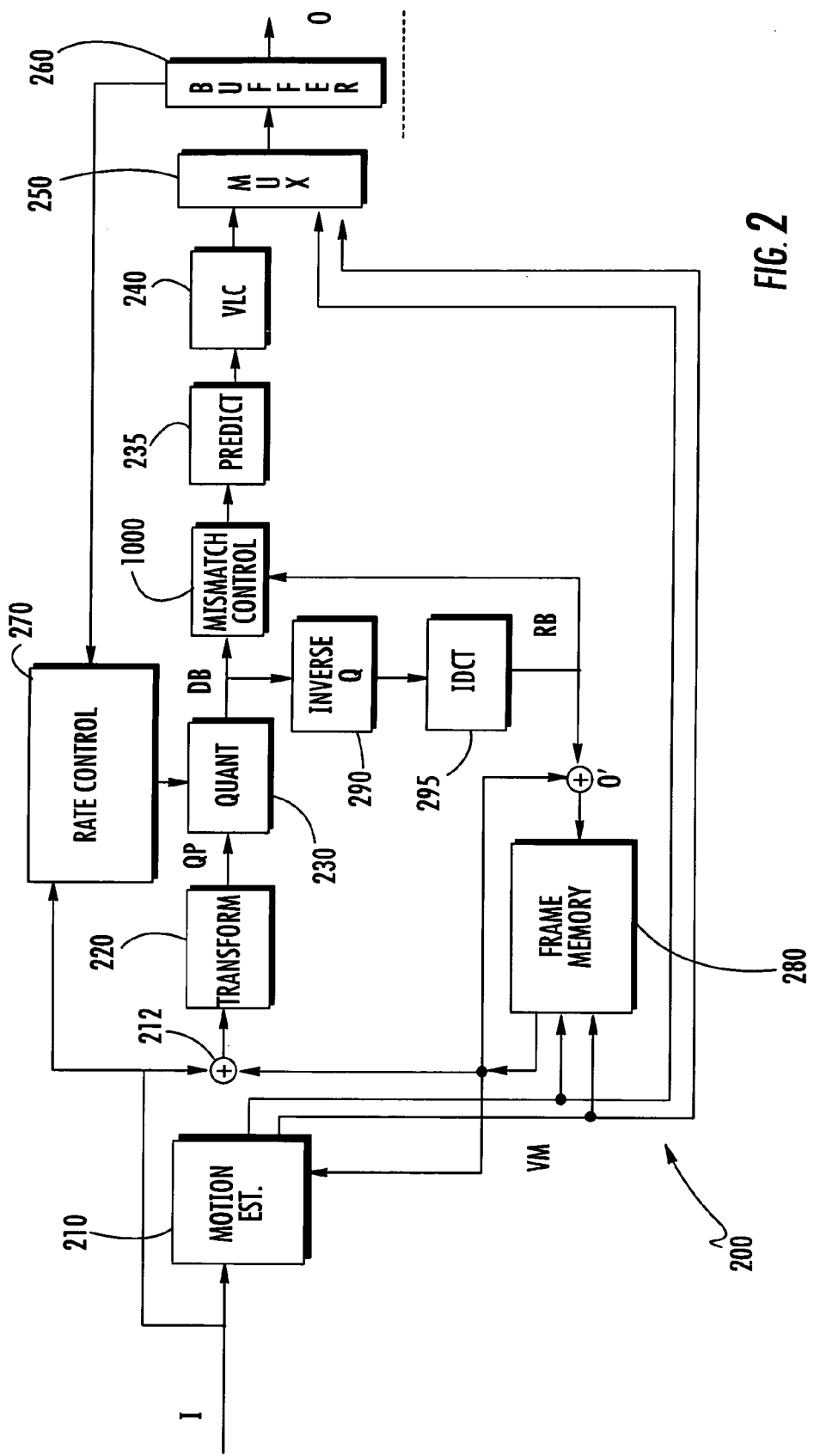
FIG. 2 is a block diagram illustrating a first embodiment of a coding device according to the invention.

FIG. 2 shows a coding device that implements the first embodiment. Represented, then, in FIG. 2 is a coding device, designated as a whole by the reference number 200, which receives at input the noncompressed-data flow I. The noncompressed-data flow I is sent at input to a motion-estimator block 210, which generates at output motion vectors VM. The noncompressed-data flow I is sent in parallel to one of the inputs of an adder 212 to be added to the output of a frame memory 280. The frame memory 280 has the function of storing the preceding frame to be used for the operations of temporal prediction together with the motion vectors VM. The sum obtained from the adder 212 is sent at input to a transformation module 220, which carries out the DCT. The output of the transformation module 220 is supplied to a quantization module 230, which applies a quantization according to a quantization parameter QP, which is supplied by a rate-control module 270. The rate-control module 270 operates on the basis of the input signal, i.e., the noncompressed-data flow I, and of the output signal, i.e., a compressed-data flow O, of the coding device 200, which the module 270 receives at two appropriate inputs of its own.

Downstream of the quantization module 230 the signal, constituted by the compressed blocks DB, is sent to an inverse-quantization module 290 and to an IDCT module 295, to obtain decompressed frames O' to be supplied to the frame memory 280, after being added to the output of the frame memory 280 in an appropriate adder 214.

The output of the quantization module 230 is likewise sent to the output of the coding device 200 through an AC/DC prediction module 235 and a variable-length-coding (VLC) module 240, which adopts VLC techniques and Huffman coding to produce a coded data flow with a good statistical efficiency of compression. The output of the VLC module 240 is sent to a multiplexer 250, together with the motion vectors VM. Set downstream of the multiplexer 250 is a buffer 260, which supplies at output the compressed-data flow O.

The modules so far described and their arrangements are in themselves known to the state of the art regarding coding devices of an MPEG type. However, according to the invention, in the coding device described in FIG. 2, provided downstream of the quantization module 230 and upstream of the AC/DC prediction module 235 is a mismatch-control module 1000. The mismatch-control module 1000 detects the blocks RB reconstructed by the IDCT module 295 and modifies the compressed blocks DB upstream of the coding performed in the AC/DC prediction module 235 and in the VLC module 240, via the operation of zero-ing the DCT coefficients of the compressed blocks DB to be coded, should a zero block be reconstructed from a block containing non-zero DCT coefficients.

The use of the procedure in the mismatch-control module 1000 imposes some constraints upon implementation of the H/W coding device. In fact, after the quantization performed in the quantization module 230, the data must wait for the results of the inverse quantization and of the IDCT in the blocks 290 and 295 to ensure that there will not be any mismatch. Upstream of the AC/DC prediction module 235 there must hence be inserted an additional buffer contained in the mismatch-control module 1000, which leads to an increase in the area dedicated to the chip, an increase in the latency of the data, and a reduction in the parallelism between the computing procedures involved.

A second embodiment of the invention overcomes the drawback of having to wait for the results of the inverse quantizations and of the IDCT before coding via the Huffman table, as well as the deterioration in the PSNR values. The second embodiment prevents the mismatch error without requiring any checks on the reconstructed block downstream of the IDCT, since it is based upon the analysis of the SAD (Sum of Absolute Differences) function and the quantizer values of the current block at the coding-device end. The information is available at the coding-device end because the motion-estimation procedure calculates it to identify the motion vectors.

The ensuing description of the second embodiment of the method proposed comprises two parts. In a first part a general approach to the mismatch error is provided, which is irrespective of the implementation of particular proprietary algorithmic procedures, for example, of a forward DCT, forward quantization, and inverse quantization type.

Described in the second part is, instead, the treatment of the specific case of the implementation of the MPEG-4-coding procedure. In the treatment that follows the errors due to the finite-precision arithmetic will not be taken into consideration in a first-order approximation. In a second step, described below, the errors will be considered and a final approach to the problem will be provided.

Regarding infinite arithmetic approximation, by virtue of Parseval's theorem, there is a connection between the energy in the DCT domain and the energy in the space domain.

$$\sum_{i=1}^{N} |x_i|^2 = \sum_{i=1}^{N} |X_i|^2 \qquad (1)$$

where $x_i$ indicate coefficients in the space domain corresponding to a block in the input data flow I and $X_i$ indicate coefficients corresponding to the DCT domain.

It is possible to set in relation the SAD function with the energy:

$$SAD \leq f\left(\sum_{i=1}^{N} |x_i|^2\right) \qquad (2)$$

The above Equation (2) enables an upper limit to be set to the mismatch error. In fact, if one finds the block that presents the maximum value for the summation $$\sum_{i=1}^{N} |x_i|^2$$

producing the mismatch error, it is possible to establish the minimum value for the SAD function that can be used for detecting the occurrence of the mismatch.

Assuming that the coefficients in the space domain $x_i$ represent the data on the mismatch error, we can write $$SAD^2 = \left(\sum_{i=1}^{N} |x_i|\right)^2 = \sum_{i=1}^{N} |x_i| \cdot \sum_{j=1}^{N} |x_j| = \sum_{i=1}^{N} \sum_{j=1}^{N} |x_i||x_j| \qquad (3)$$

but the following inequality applies:

$$x \cdot y \leq \frac{1}{2}(x^2 + y^2), \forall x, y \in \mathbb{R} \qquad (4)$$

Thus, the square of the SAD function is $$SAD^2 = \sum_{i=1}^{N} \sum_{j=1}^{N} |x_i||x_j| \leq \frac{1}{2} \sum_{i=1}^{N} \sum_{j=1}^{N} (x_i^2 + x_j^2) = \qquad (5)$$

$$\frac{1}{2}\left(N \sum_{i=1}^{N} x_i^2 + N \sum_{j=1}^{N} x_j^2\right) = N \sum_{i=1}^{N} x_i^2$$

Hence, finally, we obtain $$SAD \leq \sqrt{N \sum_{i=1}^{N} x_i^2} \qquad (6)$$

Applying Parseval's theorem, it is possible to set in relation the energy in the space domain with the energy in the DCT domain, so that $$SAD \leq \sqrt{N \sum_{i=1}^{N} x_i^2} = \sqrt{N \sum_{i=1}^{N} X_i^2} \qquad (7)$$

where $x_i$ are the coefficients in the space domain, while $X_i$ are the coefficients in the DCT domain.

Finally, on the basis of the equations given above, it is possible to attempt calculation of the minimum value of the SAD function that enables the mismatch error to be prevented. The problem can be solved by finding, from among the blocks that produce the mismatch error, the one presenting the maximum value of energy.

The impact of the finite-precision arithmetic must be considered in the light of the fact that the previous approach, in particular with reference to Equation (7) has been obtained considering the validity of Parseval's theorem, which is, however, only proven when an infinite precision of calculation is assumed.

In an implementation of a real type, the DCT is calculated using finite-precision arithmetic, so that it is necessary to take into account that the Parseval relation becomes $$E = \frac{1}{N} \sum_{i=1}^{N} |x_i|^2 = \frac{1}{N} \sum_{i=1}^{N} |X_i|^2 \qquad (8)$$

where E is the block energy. In the above calculation the SAD function in the space domain and the energy in the DCT domain are calculated, so that the FDCT (Finite Discrete Cosine Transform) error must be appropriately studied.

Assuming the finite-precision calculations as an error $\epsilon$ that affects each DCT coefficient, we can write the relation $$X_i = \overline{X}_i + \epsilon_i; \; i = 1, \ldots 64 \qquad (9)$$

where $X_i$ indicates the ideal value of the DCT coefficient, $\overline{X}_i$ is the DCT coefficient obtained with the finite-precision arithmetic and $\epsilon_i$ is the error.

Aly* $\mathfrak{R}$

Assuming that $X_i, \epsilon_i \in$ Aly* $\forall i$, we have $$E = \frac{1}{N} \sum_{i=1}^{N} |\overline{X}_i + \epsilon_i|^2 = \qquad (10)$$

$$\frac{1}{N} \sum_{i=1}^{N} \left( \overline{X}_i^2 + 2\overline{X}_i \epsilon_i + \epsilon_i^2 \right) = \frac{1}{N} \left( \sum_{i=1}^{N} \overline{X}_i^2 + \sum_{i=1}^{N} \epsilon_i^2 + 2 \sum_{i=1}^{N} \overline{X}_i \epsilon_i \right)$$

Given a maximum error $\epsilon_x = \max(\epsilon_i, i=1, \ldots, 64)$, we obtain $$E \leq \frac{1}{N} \left( \sum_{i=1}^{N} \overline{X}_i^2 + N\epsilon_x^2 + 2\epsilon_x \sum_{i=1}^{N} \overline{X}_i \right) \qquad (11)$$

The relation with the SAD function will be $$SAD \leq \sqrt{N \sum_{i=1}^{N} x_i^2} \leq \sqrt{N \left( \sum_{i=1}^{N} \overline{X}_i^2 + N\epsilon_x^2 + 2\epsilon_x \sum_{i=1}^{N} \overline{X}_i \right)} \qquad (12)$$

In the real case, to be able to exploit the approach described above, it is necessary to take into account the particular implementation of the IDCT.

Once the real implementation of the encoder has been fixed, it is thus sufficient to identify the block having maximum SAD that causes mismatch error and to use the value as upper limit Th for the equation 12. It is possible to identify also a minimum value Qpmin of the quantization parameter QP above which the mismatch does not occur. This makes it possible to avoid that blocks presenting a value assumed by the SAD function (designated in what follows as value S) lower than the threshold identified will be considered as being affected by mismatch errors when in actual fact they are not.

Consequently, the pseudocode that describes the operation of detection of the mismatch, on the basis of the value calculated in this example of embodiment, would be:

If (QP<=QPmin && *SAD<Th*)
   MismatchWarning( );

where the function MismatchWarning( ) is the function that handles the modification.

The function MismatchWarning( ) corresponding to the modification operations can have two possible embodiments that envisage the operations either of:
  resetting the block to be coded; or else of
  incrementing the value of the quantization step QP=QPmin+1.

The first approach is simple to implement and, moreover, the blocks that follow can be turned off, with a consequent lower energy consumption. The second approach is simple to implement and ensures a higher quality in so far as some of the blocks detected as being affected by mismatch, with QP=QPmin+1, will certainly not in fact be affected.

The pseudocode corresponding to the function MismatchWarning( ) for the first approach that envisages block resetting is:

For each block b
If (SAD (b)<=Th and QP<=QPmin)
   ResetBlock (out_b);
   ResetBlock (recon_b);
   Else
      dct_b=DCT (in_b);
      out_b=Q (dct_b);
      iq_b=IQ (out_b);
      recon_b=IDCT (iq_b);
      VLC (out_b);

The index b indicates the block B that is each time examined as regards SAD and QP values, i.e., the current block CB. dct_b, iq_b, recon_b and VLC represent variables corresponding to application of DCTs, quantizations, inverse quantizations and VLC coding to the blocks B at input, in_b, or at output, out_b.

Figure 3:
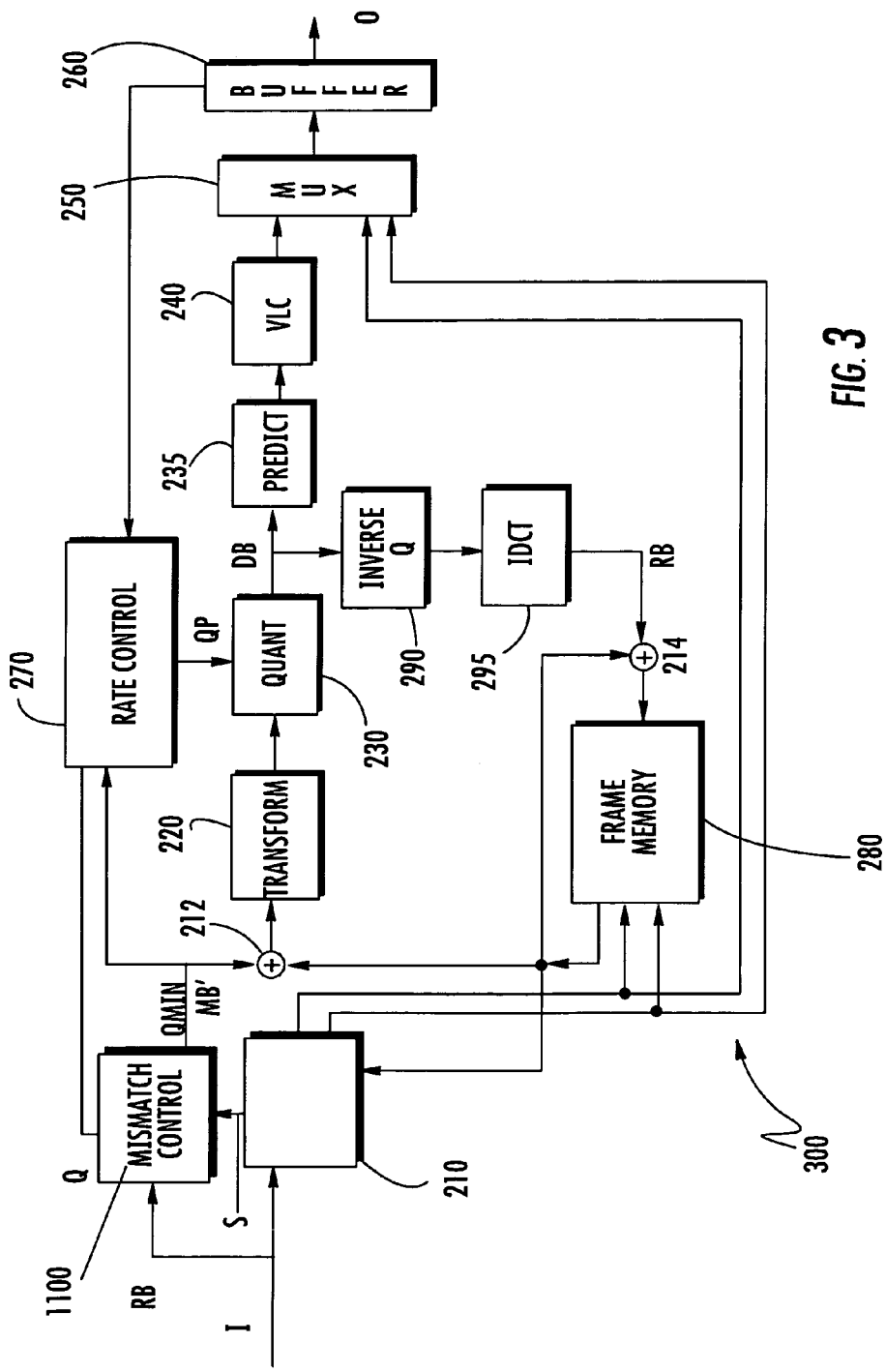
FIG. 3 is a block diagram illustrating a second embodiment of a coding device according to the invention.

An example of procedure in pseudocode comprising the function MismatchWarning( ) for the second approach, with the strategy of incrementation of the quantization step QP, is:

For each block b
   If (SAD (b)<=Th and QP<=QPmin)
      QP=QPmin+1;
      dct_b=DCT (in_b);
      out_b=Q (dct_b);
      iq_b=IQ (out_b);
      recon_b=IDCT (iq_b);
      VLC (out_b);

FIG. 3 shows a possible implementation, in a coding device 300, of the second approach for controlling mismatch described above, with the strategy of incrementation of the quantization step QP. In FIG. 3, the modules having functions similar to the ones already described with reference to FIG. 2 are designated by the same reference numbers.

In FIG. 3, a mismatch-control block 1100 is inserted so as to receive from the motion estimator 210 at one input thereof macroblocks MB derived from the noncompressed-data flow I, and at another input thereof values S of the corresponding SAD function; at a third input, the mismatch-control block 1100 receives the value of the quantization step QP applied in the compression of the current macroblock from the rate-control module 270.

At output, the mismatch-control module 1100 supplies a macroblock to be coded MB' to the adder 212, and a minimum quantizer value Qmin to the rate-control module 270. The function MismatchWarning( ) fixes the minimum value of the quantization step QP to increase the PSNR. Consequently, the procedure can, for example, be represented, in terms of program instructions in pseudocode, also as:

MB'=MB;
If (QP<=QPmin && SAD<=Th)
Qmin=QPmin+1;
else
Qmin=1

It should be noted that, in this case, the direct DCT, the quantization, the inverse quantization, and the inverse DCT can be avoided, with a lower energy consumption.

The major advantages of this type of approach include: the loop-coding device does not require any modifications; the block is coded just once; multitasking is allowed, so that each block can process different macroblocks (i.e., the quantization block can process a macroblock, whilst the DCT block can process a subsequent macroblock at the same time); a lower-limit constraint is set on the quantizer value only for critical macroblocks; and the embodiment is very simple to implement and does not require an excessive use of resources.

In actual fact, not all the blocks that present a value of the SAD function lower than the value established will give rise to mismatch. Using this procedure, a lower limit is set on the quantizer value also for these macroblocks. Consequently, without prejudice to the principle of the invention, the details of implementation and the embodiments may vary, even significantly, with respect to what is described and illustrated herein, purely by way of non-limiting example, without thereby departing from the scope of the invention, as defined in the ensuing claims.

For example, regarding the procedure of identification of the values of SAD function and of minimum quantization parameter, it is possible to obtain the values even in another way, for example, via an exhaustive procedure that tries all the combinations of values, according to a so-called 'brute force' approach.

That which is claimed is:

1. A method for block coding of a flow of data, in particular video data, via a compression operation which comprises:
applying to input-data blocks in said data flow a discrete-cosine-transform operation and a quantization operation to produce compressed-data blocks;
subjecting said compressed-data blocks to a coding operation to obtain compressed output flows; and
applying an inverse-quantization operation and an inverse discrete cosine transform operation on said compressed-data blocks to obtain reconstructed blocks; and
controlling generation of mismatch errors from said input-data blocks via the operations of:
detecting, from said input-data blocks and said compressed-data blocks, data blocks that are liable to cause mismatch errors; and
modifying said detected data blocks that are liable to cause mismatch errors prior to said coding operation.

2. The method according to claim 1, wherein said operation of detecting blocks that are liable to cause mismatch errors comprises verifying whether a block reconstructed from a compressed-data block is a zero block and whether a corresponding current block from among the input-data blocks is a non-zero block, and said modification operation comprises rendering said compressed-data block a zero block.

3. The method according to claim 2, further comprising the operation of storing temporarily the results of said quantization operation during said detection operation.

4. The method according to claim 1, wherein that said detection operation comprises evaluating a value of SAD (Sum of Absolute Differences) function and a value of a quantization step corresponding to a current input-data block.

5. The method according to claim 4, wherein said detection operation comprises evaluating whether said value of quantization step differs from a minimum value that can cause mismatch.

6. The method according to claim 4, wherein said detection operation comprises calculating the minimum value of the SAD function that is able to prevent the mismatch error and comparing said value of SAD function of blocks belonging to the input data with said minimum value.

7. The method according to claim 4, wherein said modification operation comprises zeroing the current input-data block and turning off the subsequent data blocks.

8. The method according to claim 4, wherein said modification operation comprises fixing a lower limit to said value of the quantization step on the basis of the result of said evaluation operation at an incremented value.

9. The method according to claim 1, wherein said compression operation is performed in accordance with at least one of MPEG-1, MPEG-2, MPEG-4 and H.263.

10. A device, including a combination of hardware/software components defining a plurality of modules, for block coding of a flow of data that includes a module for performing a compression on input-data blocks in the data flow, the device comprising:
a module for performing a discrete cosine transform and a quantization operation on the input data blocks to produce compressed-data blocks;
a coding module operating on said compressed-data blocks;
an inverse-quantization module and an inverse-discrete-cosine-transform module operating on said compressed-data blocks to obtain reconstructed blocks; and
a mismatch control module, upstream from said coding module, for controlling generation of mismatch errors by detecting, from the input-data blocks and the compressed-data blocks, data blocks that may cause mismatch errors and for modifying said detected data blocks.

11. The device according to claim 10, wherein said mismatch control module is connected to the output of said IDCT module to verify whether a block reconstructed from a compressed-data block is a zero block and whether a corresponding block from among the input-data blocks is a non-zero block, and for rendering said compressed-data block a zero block.

12. The device according to claim 11, wherein said mismatch control comprises temporary-memory for storing data at output from said quantization module.

13. The device according to claim 10, wherein said mismatch control module receives at input a current block of the input data flow, a value of a SAD (Sum of Absolute Differences) function corresponding to said current block from a motion-estimation module, and a value of quantization step corresponding to said current block from a rate-control module, and wherein said mismatch control module is configured for enabling, according to said value of the SAD function and said value of the quantization step, execution of said operation of modifying said blocks that may to cause mismatch errors.

14. The device according to claim 13, wherein said mismatch-control module is configured for evaluating whether said value of the quantization step is higher than the minimum value that will produce mismatch error.

15. The device according to claim 13, wherein said mismatch control module is configured for calculating the minimum value of the SAD function that enables the mismatch error to be prevented and compare said value of SAD function of the current block with said minimum value.

16. The device according to claim 13, wherein said mismatch control is configured for zeroing the block (MB) that may cause mismatch errors and turning off the subsequent blocks.

17. The device according to claim 13, wherein said mismatch control module is configured for executing said modification operation by calculating an incremented value of the quantization step and supplying said incremented value of the quantization step to said rate-control module.

18. The device according to claim 10, wherein said compression module operates in accordance with at least one MPEG-1, MPEG-2, MPEG-4 and H.263.

19. A non-transitory computer-readable medium loadable into a memory of at least one computer and comprising software code portions for implementing the method according to claim 1.

20. A method for block coding of video data, via a compression operation, the method comprising;
applying, to input-data blocks, a discrete-cosine-transform (DCT) operation and a quantization operation to produce compressed-data blocks;
detecting, from the input-data blocks and the compressed-data blocks, data blocks that may cause mismatch errors;
modifying the detected data blocks; and
coding the compressed-data blocks including modified data blocks to obtain compressed output data.

21. The method according to claim 20, wherein detecting comprises verifying whether a block reconstructed from a compressed-data block is a zero block and whether a corresponding current block from among the input-data blocks is a non-zero block, and wherein modifying comprises rendering the compressed-data block a zero block.

22. The method according to claim 21, further comprising temporarily storing results of the quantization operation during the detection.

23. The method according to claim 20, wherein detecting comprises evaluating a value of a SAD (Sum of Absolute Differences) function and a value of a quantization operation corresponding to a current input-data block.

24. The method according to claim 23, wherein detecting further comprises evaluating whether the value of the quantization operation differs from a minimum value that can cause mismatch.

25. The method according to claim 23, wherein detecting further comprises calculating the minimum value of the SAD function that is able to prevent the mismatch error, and comparing the minimum value with the value of the SAD function of blocks belonging to the input data blocks.

26. The method according to claim 23, wherein modifying comprises zeroing a current input-data block and turning off the subsequent data blocks.

27. The method according to claim 23, wherein modifying comprises fixing a lower limit to the value of the quantization operation based upon the result of the evaluation operation at an incremented value.

* * * * *

UNITED STATES PATENT AND TRADEMARK OFFICE
CERTIFICATE OF CORRECTION

| | |
|---|---|
| PATENT NO. | : 7,974,483 B2 |
| APPLICATION NO. | : 11/267077 |
| DATED | : July 5, 2011 |
| INVENTOR(S) | : Bruna et al. |

It is certified that error appears in the above-identified patent and that said Letters Patent is hereby corrected as shown below:

Column 3, Line 66   Delete: "co-ordinate"
                    Insert: --coordinate--

Column 4, Line 7    Delete: "of"
                    Insert: --of a--

Column 4, Line 30   Delete: "enables"
                    Insert: --enable--

Column 7, Line 42   Delete: "Aly*   ℜ"

Column 7, Line 43   Delete: "$X_i, \varepsilon_i \in$ Aly*  $\forall i$"
                    Insert: -- $X_i, \varepsilon_i \in \Re \, \forall i$ --

Column 8, Line 50   Delete: "to application"
                    Insert: --to the application--

Column 9, Line 42   Delete: "of non-limiting"
                    Insert: --of a non-limiting--

Column 11, Line 7   Delete: "may to cause"
                    Insert: --may cause--

Column 11, Line 15  Delete: "compare"
                    Insert: --comparing--

Signed and Sealed this
Eleventh Day of October, 2011

David J. Kappos
*Director of the United States Patent and Trademark Office*